US011636355B2

(12) United States Patent
Li et al.

(10) Patent No.: US 11,636,355 B2
(45) Date of Patent: Apr. 25, 2023

(54) INTEGRATION OF KNOWLEDGE GRAPH EMBEDDING INTO TOPIC MODELING WITH HIERARCHICAL DIRICHLET PROCESS

(71) Applicant: Baidu USA, LLC, Sunnyvale, CA (US)

(72) Inventors: Dingcheng Li, Sammamish, WA (US); Jingyuan Zhang, San Jose, CA (US); Ping Li, Bellevue, WA (US); Siamak Zamani Dadaneh, Bryan, TX (US)

(73) Assignee: Baidu USA LLC, Sunnyvale, CA (US)

( * ) Notice: Subject to any disclaimer, the term of this patent is extended or adjusted under 35 U.S.C. 154(b) by 1000 days.

(21) Appl. No.: 16/427,225

(22) Filed: May 30, 2019

(65) Prior Publication Data

US 2020/0380385 A1 Dec. 3, 2020

(51) Int. Cl.
*G06F 40/289* (2020.01)
*G06N 5/04* (2023.01)
(Continued)

(52) U.S. Cl.
CPC ............... *G06N 5/04* (2013.01); *G06F 40/20* (2020.01); *G06F 40/289* (2020.01); *G06N 20/00* (2019.01)

(58) Field of Classification Search
CPC .......... G06N 5/04; G06N 20/00; G06F 40/20; G06F 40/14; G06F 40/149; G06F 40/166;
(Continued)

(56) References Cited

U.S. PATENT DOCUMENTS 8,645,298 B2 * 2/2014 Hennig .................. G06N 20/00 707/738
2015/0154286 A1 * 6/2015 Lightner ................. G06F 16/35 707/728

(Continued)

OTHER PUBLICATIONS

Ma et al., "A Hybrid Discriminative Mixture Model for Cumulative Citation Recommendation", Jan. 16, 2019, IEEE Transactions on Knowledge and Data Engineering, vol. 32, No. 4, Apr. 2020, 617-630 (Year: 2019).*

(Continued)

*Primary Examiner* — Vijay B Chawan
(74) *Attorney, Agent, or Firm* — North Weber & Baugh LLP

(57) ABSTRACT

Leveraging domain knowledge is an effective strategy for enhancing the quality of inferred low-dimensional representations of documents by topic models. Presented herein are embodiments of a Bayesian nonparametric model that employ knowledge graph (KG) embedding in the context of topic modeling for extracting more coherent topics; embodiments of the model may be referred to as topic modeling with knowledge graph embedding (TMKGE). TMKGE embodiments are hierarchical Dirichlet process (HDP)-based models that flexibly borrow information from a KG to improve the interpretability of topics. Also, embodiments of a new, efficient online variational inference method based on a stick-breaking construction of HDP were developed for TMKGE models, making TMKGE suitable for large document corpora and KGs. Experiments on datasets illustrate the superior performance of TMKGE in terms of topic coherence and document classification accuracy, compared to state-of-the-art topic modeling methods.

20 Claims, 7 Drawing Sheets

100

(51) Int. Cl.
*G06N 20/00* (2019.01)
*G06F 40/20* (2020.01)

(58) Field of Classification Search
CPC .... G06F 40/253; G06F 40/284; G06F 40/289; G06F 40/56; G06F 40/51; G06F 40/106; G06F 40/131; G06F 40/137; G06F 40/279
See application file for complete search history.

(56) References Cited

U.S. PATENT DOCUMENTS

| | | | | |
|---|---|---|---|---|
| 2015/0154509 | A1* | 6/2015 | Lightner | G06F 16/901 706/12 |
| 2016/0110343 | A1* | 4/2016 | Kumar Rangarajan Sridhar | G06F 40/216 704/9 |
| 2016/0189047 | A1* | 6/2016 | Meij | G06F 16/951 706/11 |
| 2017/0075991 | A1* | 3/2017 | Kataria | G06F 16/9558 |
| 2017/0255862 | A1* | 9/2017 | Li | G06F 16/9035 |
| 2018/0082194 | A1* | 3/2018 | Lozano | G06F 16/285 |
| 2018/0232648 | A1* | 8/2018 | Acharya | G06N 3/0472 |
| 2019/0057310 | A1* | 2/2019 | Olmstead | G06F 40/284 |

OTHER PUBLICATIONS

Wang et al., "A Knowledge Graph Enhanced Topic Modeling Approach for Herb Recommendation", Apr. 24, 2019, DASFAA 2019, LNCS 11446, 709-724 (Year: 2019).*
Li et al.,"TMSA: A Mutual Learning Model for Topic Discovery and Word Embedding,"In Proc. of the SIAM conf. on Data Mining (SDM), 2019. (9pgs).
Li et al.,"Generative topic embedding: a continuous representation of documents," arXiv preprint arXiv:1606.02979, 2016. (13pgs).
Li et al.,"Pachinko allocation: Dag-structured mixture models of topic correlations," In Proc. of the 23rd Intr. conf. on Machine learning (ICML), 2006. (8pgs).
MacEachern et al.,"Estimating mixture of dirichlet process models," Journal of Computational and Graphical Statistics,7(2):223-238, 1998. (20pgs).
Manning et al.,"The Stanford CoreNLP natural language processing toolkit," In Proc. of 52nd annual meeting of the association for computational linguistics (ACL), 2014. (6pgs).
Mikolov et al.,"Distributed representations of words and phrases and their compositionality," arXiv preprint arXiv:1310.4546, 2013. (9pgs).
G. A. Miller,"WordNet: a lexical database for English," Communications of the ACM, 38(11):39-41. 1995. (2pgs).
Mimno et al.,"Optimizing semantic coherence in topic models," In Proc. of the 2011 Conf. on Empirical Methods in Natural Language Processing (EMNLP), pp. 262-272, 2011.(11 pg.
Newman et al.,"Automatic evaluation of topic coherence," In Human Language Technologies: The 2010 Annual Conference of the North American Chapter of the Association for Computational Linguistics (NAACL), pp. 100-108, 2010. (9gps).
Nguyen et al.,"Improving topic models with latent feature word representations," arXiv preprint arXiv:810.06306, 2018. (15pgs).
Pennington,"GloVe: Global Vectors for Word Representation," In Proc. of the 2014 conf. on empirical methods in natural language processing (EMNLP), 2014. (12pgs).
J.Pitman,"Poisson-Dirichlet and GEM invariant distributions for split-and-merge transformations of an interval partition," Combinatorics, Probability and Computing, 11(5):1-20, 2002. (20pgs).
Masa-Aki Sato, "Online model selection based on the variational bayes," Neural computation, 13 (7):1649-1681. 2001. (11 pgs).
J. Sethuraman,"A constructive definition of dirichlet priors," Statistica sinica, pp. 639-650, 1994 (12pgs).
Shi et al.,"Jointly learning word embeddings and latent topics," arXiv preprint arXiv:1706.07276, 2017. (10pgs).
Teh et al.,"Sharing clusters among related groups: Hierarchical dirichlet processes," In Advances in neural information processing systems (NIPS), 2005. (8pgs).
Teh et al.,"Collapsed variational inference for HDP," In Advances in neural information processing systems (NIPS), 2008. (8 pgs).
Wang et al.,"Online variational inference for the hierarchical dirichlet process," In Proc. of the 14th Int. Con. on Artificial Intelligence & Statistics, 2011. (9gps).
Andrzejewski & Zhu,"Latent dirichlet allocation with topic-in-set knowledge," Proceedings of the NAACL HLT Workshop on Semi-supervised Learning for Natural Language Processing, pp. 43-48, 2009 (6pgs).
Andrzejewski et al.,"Incorporating domain knowledge into topic modeling via dirichlet forest priors," Proceedings of the 26th annual international conference on machine learning (ICML), 2009. (8pgs).
Batmanghelich et al.,"Nonparametric spherical topic modeling with word embeddings," Proceedings of the 54th Annual Meeting of the Association for Computational Linguistics (ACL), 2016. (6pgs).
Bengio et al.,"A Neural probabilistic language model," Journal of machine learning research, 3(Feb):1137-1155, 2003. (19pgs).
Bird & Loper,"NLTK: The natural language toolkit," Proceedings of the ACL 2004 on Interactive poster and demonstration sessions, 2004.(8pgs).
Blei et al.,"Latent dirichlet allocation," Journal of Machine Learning Research 3 (2003) 993-1022, 2003. (30pgs).
A. Bleier, "Practical collapsed stochastic variational inference for the HDP," arXiv preprint arXiv:1312.0412, 2013. (4pgs).
Yao et al.,"Incorporating knowledge graph embeddings into topic modeling," In Proc. of the 31st. AAAI Con. on Artificial Intelligence (AAAI), 2017. (9pgs).
Zhao et al.,"MetaLDA: A topic model that efficiently incorporates meta information," arXiv preprint arXiv:1709.06365, 2017. (10pgs).
Fox et al.,"A sticky HDP-HMM with application to speaker diarization," arXiv preprint arXiv:0905.2592, 2011. (38pgs).
Goldberg et al.,"word2vec explained:deriving mikolov et al.'s negative-sampling word-embedding method," arXiv preprint arXiv:1402.3722, 2014. (5pgs).
Hoffman et al.,"Online Learning for Latent Dirichlet Allocation," In Neural Information Processing Systems (NIPS), 2010. (9pgs).
T Hofmann,"Probabilistic latent semantic indexing," In ACM SIGIR Forum, pp. 211-218 ACM, 2017. (8pgs).
Hu et al.,"Topic-based embeddings for learning from large knowledge graphs,"In Proc. of the 19th Intr. Conf. on Artificial Intelligence & Statistics,1133-1141, 2016.(9pgs).
Hu et al., "Interactive topic modeling," Proc. of the 49th Annual Mtg. of ACL, 248-257, 2011. (10 pgs).
Jagarlamudi et al.,"Incorporating lexical priors into topic models," In Proc. of the 13th Conf. of the European Chapter of the Association for Computational Linguistics (EACL) 204-213, 2012. (10pgs).
Lau et al.,"The sensitivity of topic coherence evaluation to topic cardinality," In: Proc. of the 2016 Conf. of the North American Chapter of the Association for Computational Linguistics: Human Language Technologies (NAACL HLT), 2016. (5pgs).
Bordes et al.,"Translating embeddings for modeling multirelational data," Advances in Neural Information Processing Systems (NIPS), 2013. (9pgs).
Bordes et al.,"Learning structured embeddings of knowledge bases," Proceedings of the 25th AAAI Conference on Artificial Intelligence (AAAI), 2011. (6pgs).
Chang et al.,"Reading tea leaves: How humans interpret topic models," Advances in Neural Information Processing Systems (NIPS), 2009.(9pgs).
Chemudugunta et al.,"Modeling documents by combining semantic concepts with unsupervised statistical learning," Proceedings of the 7th ISWC, 2008. (16pgs).
Chen & Liu,"Mining topics in documents: standing on the shoulders of big data," Proceedings of the 20th ACM SIGKDD International Conference on Knowledge Discovery and Data Mining (KDD), 2014.(10pgs).
Chen et al.,"Discovering coherent topics using general knowledge," 22nd ACM international conference on Information& Knowledge Management (CIKM), 2013. (10pgs).

(56) References Cited

OTHER PUBLICATIONS

Das et al.,“Gaussian LDA for topic models with word embeddings,” In Proc. of the 53rd Annual Meetingof the Association for Computational Linguistics & the 7th Intr. Joint Conf. on Natural Language Processing of the Asian Federation of Natural Language Processing (ACL), 2015. (10pgs).

Doshi-Velez et al.,“Graph-sparse LDA: A topic model with structured sparsity,” arXiv preprint arXiv:1410.4510, 2014. (12pgs).

* cited by examiner

200

300

305 — Given a corpus of documents in which each document comprises words and entities:
(1) Use entity embeddings obtained from a knowledge graph to represent entities that appear in the corpus of documents; and
(2) For each document in the corpus of documents, generating a word frequency representation for words from the document 310 — Use the entity embeddings and the word frequency representations as an input to a topic model to generate latent topics for the corpus of documents, the topic model comprising:
- a corpus-level Dirichlet process that uses the word frequency representations and the entity embeddings to obtain a shared base measure that is used as a prior for two document-level Dirichlet processes;
- a first document-level Dirichlet process that uses the shared base measure as a prior to generate a latent topic distribution for words;
- a second document-level Dirichlet process that uses the shared base measure as a prior to generate a latent topic distribution for entity embeddings;
- a word generative process that use the latent topic distribution for words and a word-level Dirichlet process to assign latent topics to words; and
- using the topic distribution for entity mixtures and a distribution to assign latent topics to entity embeddings

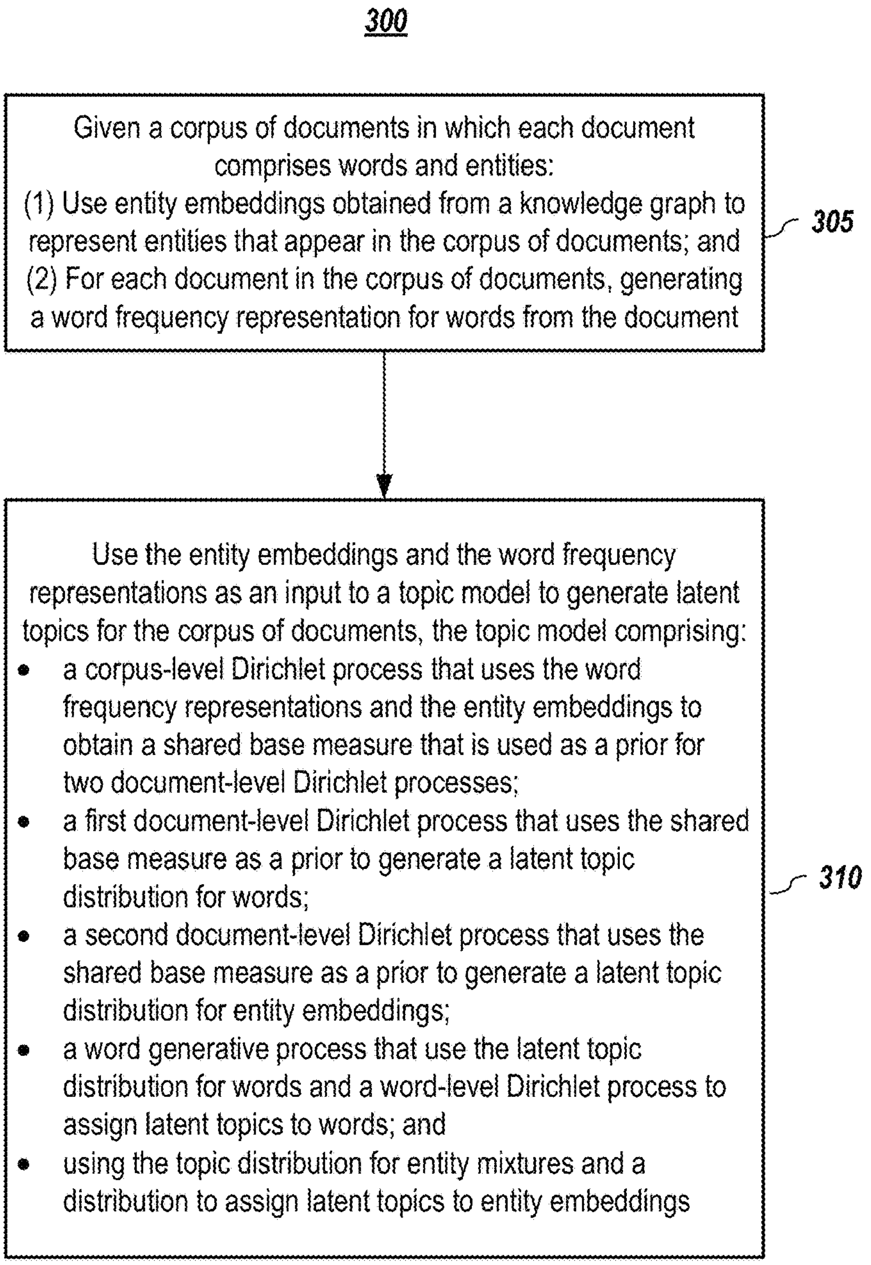

| 20NG | | | NIPS | | | Ohsumed | | |
|---|---|---|---|---|---|---|---|---|
| lord | tcp/ip | kuwait | distribution | network | tube | vietnam | hemagglutinin | shbg |
| God | drive | iraq | gaussian | learning | regression | veterans | anti-tumor | patients |
| elohim | system | kuwaiti | posterior | model | svs | mthfr | mthfr | globulin |
| jesus | computer | sabah | covariance | neural | support | income | tumor | testicular |
| subject | information | abdulla | ensemble | data | fraction | white | pbl | hormone |
| israel | space | gulf | matrix | figure | erros | proportion | antibody | levels |
| armenian | windows | amir | KL | information | vapnik | drinking | meh | group |
| christ | data | ahmed | divergence | units | algorithm | era | ab test | sex |
| john | message | sheikh | approximate | problem | smola | lifetime | verapamil | binding |
| organization | software | saudi | algorithm | recognition | vector | interview | radioactivity | treatment |
| 101.2 | 98.5 | 119.3 | 152.6 | 91.1 | 106.3 | 105.4 | 135.4 | 152.2 |
| 20NG | | | NIPS | | | Ohsumed | | |
| internet | drive | car | distribution | control | kernel | gene | cancer | treatment |
| mail | windows | cars | bayesian | trajectory | support | dna | tumor | therapy |
| email | dos | engine | gaussian | robot | xi | protein | survival | dose |
| list | card | oil | prior | controller | vector | region | tumors | drug |
| information | disk | miles | posterior | arm | margin | genetic | carcinoma | effects |
| address | mac | dealer | probability | model | examples | analysis | breast | placebo |
| fax | scsi | speed | variables | forward | set | mutation | stage | trial |
| network | memory | buy | markov | motor | kernels | sequence | malignant | oral |
| send | system | ford | distribution | trajectories | svm | molecular | chemotherapy | mg |
| e-mail | apple | drive | approximation | inverse | machines | mrna | primary | effective |
| 89.21 | 84.37 | 63.6 | 154.8 | 86.19 | 88.28 | 149.9 | 107.7 | 106.5 |

INTEGRATION OF KNOWLEDGE GRAPH EMBEDDING INTO TOPIC MODELING WITH HIERARCHICAL DIRICHLET PROCESS

BACKGROUND

A. Technical Field

The present disclosure relates generally to systems and methods for computer learning that can provide improved computer performance, features, and uses. More particularly, the present disclosure relates to embodiments of efficient neural network architecture that achieve a high compute intensity and fast inference.

B. Background

Topic models, such as Probabilistic Latent Semantic Analysis (PLSA) and Latent Dirichlet Allocation (LDA) can play significant roles in helping machines interpret text documents. Topic models consider documents as a bag of words. Given the word information, topic models attempt to view documents as mixtures of latent topics, where these topics are generated via distributions over words. Bayesian methods have been utilized to extract topical structures from the document-word frequency representations of a text corpus. Without supervision, however, it has been found that the topics generated from these models are often not interpretable. In recent studies, incorporating knowledge of different forms as a supervision has become a powerful strategy for discovering meaningful topics.

Most conventional approaches take prior domain knowledge into account to improve the topic coherence. One commonly used domain knowledge is based on word correlations. For example, must-links and cannot-links among words are generated by domain experts to help topic modeling. Another useful form of knowledge for topic discoveries is based on word semantics. In particular, word embedding, in which bag of words are transformed into vector representations so that contexts are embedded into those word vectors, are used as semantic regularities to enhance topic models.

Knowledge graph (KG) embedding learns a low-dimensional continuous vector space for entities and relations to preserve the inherent structure of KGs. Some proposed KGE-LDA to incorporate embeddings of KGs into topic models to extract better topic representations for documents and showed some promising performance. However, KGE-LDA forces words and entities to have identical latent representations, which is a rather restrictive assumption that prevents the topic model from recovering correct underlying latent structures of the data, especially in scenarios where only partial KGs are available.

Accordingly, what is needed are improved systems and methods for topic modeling.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

FIG. 3 depicts a method for determining latent topics for a corpus of documents, according to embodiments of the present disclosure.

FIG. 6 depicts TABLE 2, which shows example topics with point-wise mutual information (PMI) Topic Coherence metric scores learned from the three corpora by a TMKGE model embodiment versus two other models, according to embodiments of the present disclosure.

DETAILED DESCRIPTION OF EMBODIMENTS

Figure 1:
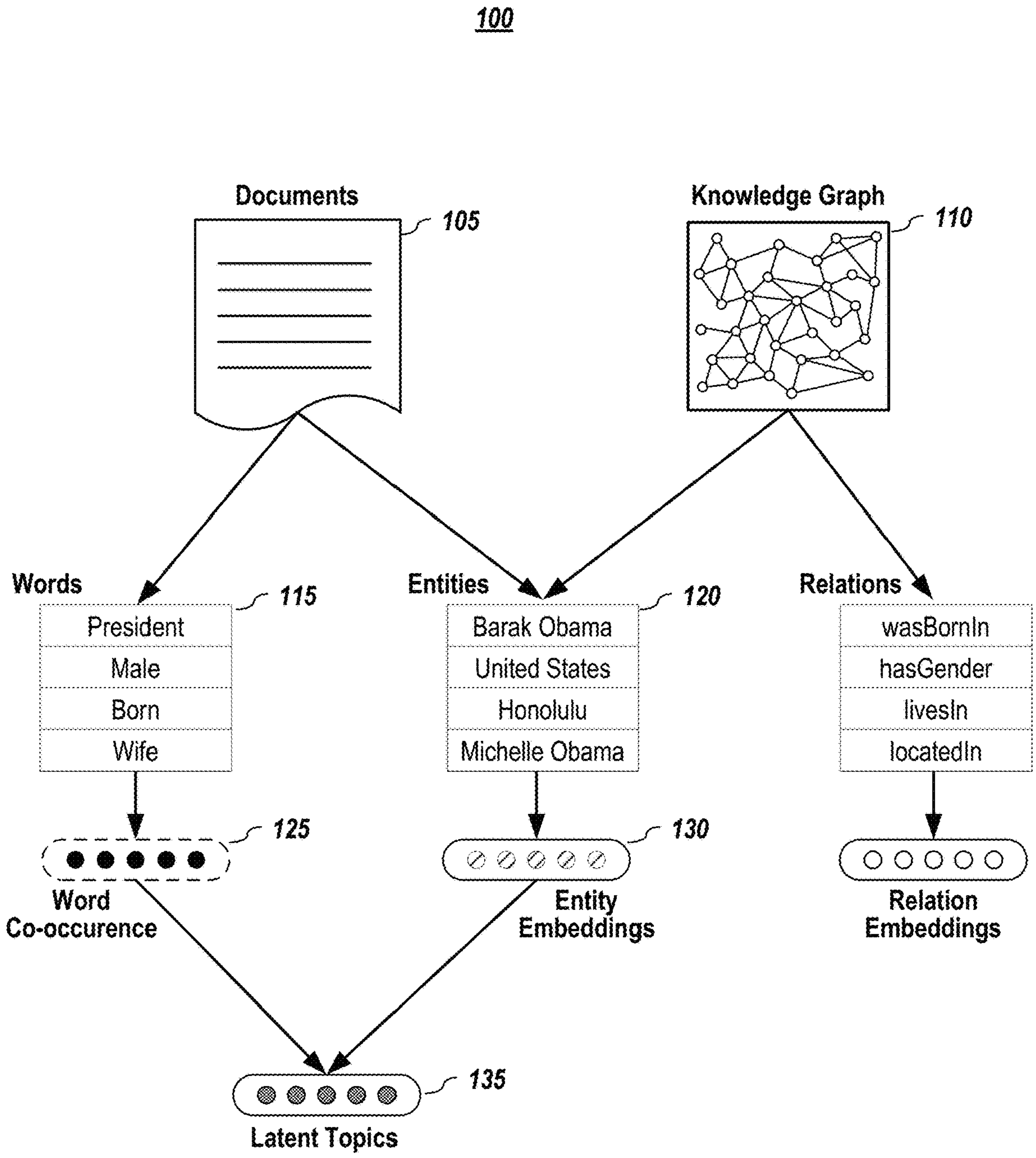
FIG. 1 graphically depicts an overview of a topic modeling with knowledge graph embedding (TMKGE) model, according to embodiments of the present disclosure. In one or more embodiments, a TMKGE model may be trained using online stochastic optimization with natural gradients for variational inferences.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. INTRODUCTION

Presented herein are embodiments of topic modeling with knowledge graph embedding (TMKGE), which are hierarchical Dirichlet process (HDP)-based models to extract more coherent topics by taking advantage of the KG structure. Unlike KGE-LDA, the TMKGE embodiments allow for more flexible sharing of information between words and entities, by using, in one or more embodiments, a multinomial distribution to model the words and a multivariate Gaussian mixture to model the entities. In one or more embodiments, two proportional vectors—one for words and one for entities—are used. In contrast, KGE-LDA only uses one, shared by both words and entities. TMKGE embodiments include a collection of Dirichlet processes (DPs) at both corpus and document levels. The atoms of corpus-level DP form the base measure for document levels DPs of words and entities. Therefore, the atoms of corpus-level DP can represent word topics, entity mixture components (e.g., entity embeddings), or both of them. FIG. 1 graphically depicts an overview of a topic modeling with knowledge graph embedding (TMKGE) flow, where two sources of inputs, bag of words 125 and knowledge graph (KG) embedding 130, extracted from corpus 105 and a knowledge graph or graphs 110, respectively, are used to obtain latent topics. As illustrated in FIG. 1, entities 120 are shared by both documents 105 and knowledge graph(s) 110. Entity embeddings 130, which may be generated by TransE—a knowledge graph embedding package, are passed into the TMKGE embodiment to generate hidden topics 135. Using a method that models relationships in multi-relational data (e.g., a knowledge graph) by interpreting them as relations operating on the low-dimensional embeddings of the entities incorporates relationship information in the entity representation for TMKGE embodiments.

As a nonparametric model, the TMKGE embodiments do not assume a fix number of topics or entity mixture components as constraints. Instead, they learn the number of topics and entity mixture components automatically from the data. Furthermore, an efficient online variational inference algorithm was developed, based on Sethuraman's stick-breaking construction of HDP. In one or more embodiments, stick-breaking inference is constructed in a minibatch fashion to derive a more efficient and scalable coordinate accent variational inference for TMKGE embodiments.

Some of the contributions of the present disclosure include the following. First, TMKGE embodiments are Bayesian nonparametric models that extract more coherent topics by taking advantage of knowledge graph structures. Second, two proportional vectors are introduced for more flexible sharing of information between words and entities. Third, an efficient and scalable parameter estimation algorithm is derived via online variational inference. Finally, the effectiveness of TMKGE embodiments in topic discovering and document classification are empirically demonstrated.

B. RELATED WORK

Latent Dirichlet Allocation (LDA) is a popular probabilistic model that learns latent topics from documents and words, by using Dirichlet priors to regularize the topic distributions. The generated topics from LDA models, however, are often not interpretable, in part because LDA models are unsupervised without using prior knowledge or external resources.

In recent years, prior knowledge has been leveraged to guide the process of topic modeling. For example, a deep forest LDA (DF-LDA) model has been proposed to incorporate must-links and cannot-links among words into topic modeling. One weakness of the DF-LDA model is that the link information is domain-dependent. Later, general knowledge-based LDA were introduced to leverage must-links from multiple domains. More recently, MetaLDA proposes to improve topic modeling by incorporating diverse meta information as priors for both document hyperparameter $\alpha$ and word hyperparameter $\beta$.

Besides the word correlations, word semantics are also utilized as one type of useful knowledge for topic modeling. Word embeddings, as low-dimensional continuous vectors of words are regarded to be an efficient representations of word semantics. Latent Feature Topic Modeling (LFTM) has been proposed to use pre-trained word embeddings in topic modeling. It incorporates the embedding of a word and its topics into the traditional multinomial distribution over words as the probability function of topic modeling. TopicVec extends LFTM by combining a word and its local contextual words together into the conventional multinomial distribution over words. It also learns embedding representations for topics. Gaussian-LDA goes further to improve topic modeling by taking into considerations the continuous nature of word embeddings. Some constructed a more unified framework, STE (skip-gram topic embedding) to address the problem of polysemy. Others proposed a unified framework TMSA (Topic Modeling and Sparse Autoencoder) to improve topic discovery and word embedding simultaneously via a mutual learning mechanism.

Some have proposed topic-based embeddings for learning from large knowledge graphs (KGE). KGE learns low-dimensional continuous vector space for both entities and relations to preserve the inherent structure of knowledge graphs. A Bayesian method is introduced by considering the embeddings of entities and relations as topics. Later, others proposed knowledge graph embedding LDA (KGE-LDA) to encode entity embeddings learned from knowledge graphs into LDA and allegedly showed that knowledge graph embeddings boost topic discoveries.

Embodiments herein utilize entity embeddings to encode prior knowledge for topic modeling.

C. MODEL EMBODIMENTS & VARIATIONAL INFERENCE EMBODIMENTS

This section presents TMKGE model embodiments and embodiments of an efficient online variational inference for learning TMKGE model parameters. A review of hierarchical Dirichlet process (HDP) is provided for convenience first.

1. Preliminaries of Hierarchical Dirichlet Process (HDP)

Dirichlet process (DP)$G \sim DP(\gamma_0, G_0)$, with a base measure $G_0$ and a concentration parameter $\gamma_0>0$, is the distribution of a random probability measure G over a measurable space $(\Omega, \beta)$, such that for any measurable disjoint partition $(A_1, \ldots, A_Q)$ of $\Omega$, $(G(A_1) \ldots, G(A_Q)) \sim Dir(\gamma_0 G_0(A_1), \ldots, \gamma_0 G_0(A_Q))$, where "Dir" denotes a Dirichlet distribution.

Hierarchical Dirichlet process (HDP), which was introduced for dealing with multiple (D) groups of data, is a distribution over a set of random probability measures over $(\Omega, \beta)$: one probability measure $G_d \sim DP(\alpha_o, G_0)$ for each group $d \in \{1, 2, \ldots, D\}$, and a global probability measure $G_0 \sim DP(\gamma_0, H)$ with a base measure H.

Stick-breaking construction shows that the draws from Go and Gd can be expressed as weighted sums of point masses:

$$G_0 = \sum_{k=0}^{\infty} B_k \delta_{\phi_k},$$

$$G_d = \sum_{k=0}^{\infty} \pi_{dk} \delta_{\phi_k}$$

A more convenient stick-breaking construction, especially for deriving closed-form variational inference, is Sethuraman' s construction (in Jayaram Sethuraman. A constructive definition of Dirichlet priors. *Statistica sinica*, 4(2):639-650, 1994), which proceeds as follows. First, the global-level DP draw is represented as:

$$\beta'_k \sim \text{Beta}(1, \gamma_0),$$

$$\beta_k = \beta'_k \prod_{\ell=1}^{k-1} (1 - \beta'_\ell)$$

Note that the distribution for $\beta = \{\beta_k\}_{k=1}^{\infty}$ is also commonly written as $\beta \sim GEM(\gamma_0)$. Subsequently, the group-level draws are constructed as:

$$\psi_{dt} \sim G_0, \tag{1}$$

$$\pi'_{dt} = \text{Beta}(1, \alpha_0),$$

$$\pi_{dt} = \pi'_{dt} \prod_{\ell=1}^{t-1} (1 - \pi'_{d\ell}),$$

-continued $$G_d = \sum_{t=1}^{\infty} \pi_{dt} \delta_{\psi_{dt}}.$$

Alternatively, the group-level atoms $\{\psi_{dt}\}_{t=1}^{\infty}$ can be represented as $\psi_{dt} = \phi_{c_{dt}}$, where the auxiliary indicator variables $c_{dt}$ are independently drawn from a multinomial Mult $(\beta)$.

A collapsed inference method has been proposed as an alternative of stick-breaking inference. However, in one or more embodiments, the uncollapsed HDP model was used considering the truncated Dirichlet process disclosed herein has more computational efficiency and is simple to implement.

2. TMKGE Model Embodiments

Figure 2:
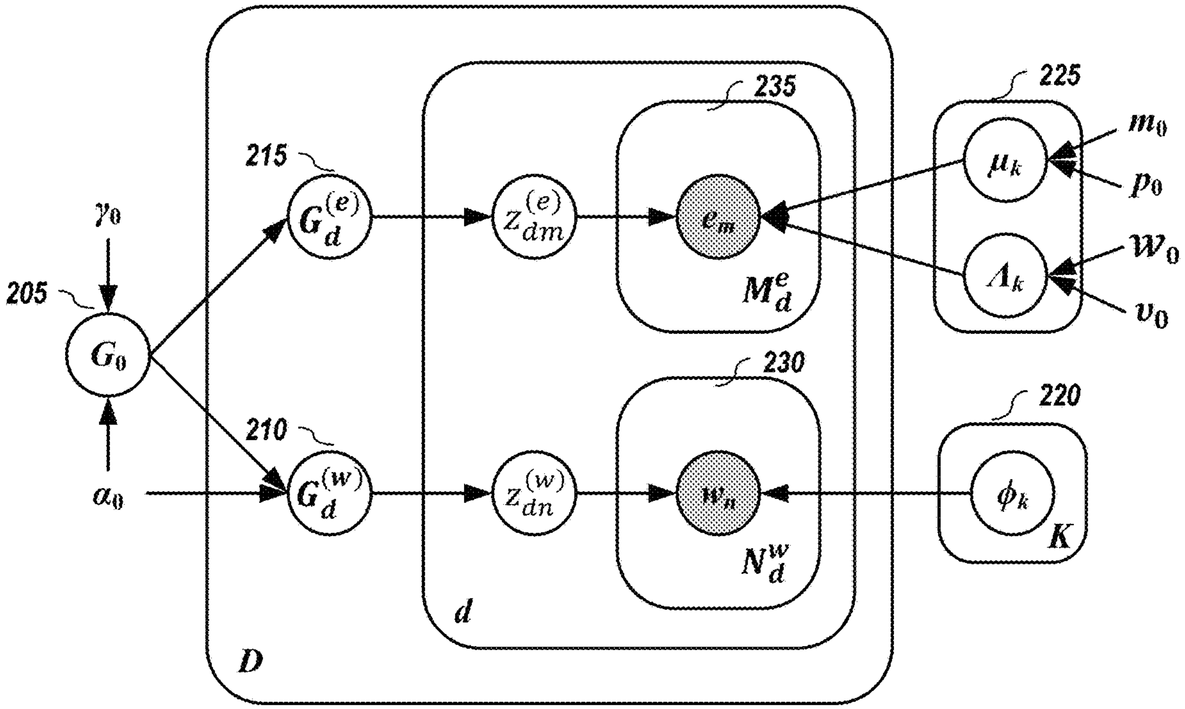
FIG. 2 graphically represents a TMKGE framework which includes two components—one for word (the lower component) and one for entities (the upper component)—that both share a Dirichlet process as priors, according to embodiments of the present disclosure.

FIG. 2 depicts a graphical representation of a topic modeling with knowledge graph embedding (TMKGE) framework 200, according to embodiments of the present disclosure. As shown in the depicted embodiment, there are two components, the lower component is for words and the upper of which is for entities. Both components share the Dirichlet process 205 as priors. Since entities are represented with knowledge graph embeddings, in one or more embodiments, each entity is generated with Gaussian priors while the one for words is still generated with Dirichlet priors.

Let D denote the number of documents in the corpus, where each document d E $\in \{1, 2, \ldots, D\}$ contains $N_d^{(e)}$ words and $M_d^{(e)}$ entities. In this patent document, superscripts (w) and (e) indicate word-related and entity-related parameters, respectively. In each document d, the n-th word is represented by $w_{dn}$, where each word belongs to a vocabulary of size V, i.e., $w_{dn} \in \{1, 2, \ldots, V\}$. Furthermore, the P-dimensional embedding of the m-th entity is $e_{dm}$, where the total number of unique entities in the corpus is E. In one or more embodiments, it is assumed that entity embeddings are obtained from the "complete" knowledge graph, and hence they contain information independent of the corpus. In one or more embodiments, TransE, a simple and effective tool for knowledge encoding, was used to calculate the embeddings of entities extracted from the documents, although different methods may be used to obtain the embeddings of entities extracted from the documents. In one or more embodiments, the normalization step of TransE was removed and thus the output vectors ($e_{dm}$) do not have unit $\ell_2$ norm.

TMKGE embodiments build upon HDP for joint modeling of word topics and entity mixtures. At the corpus level, word topics and entity mixtures correspond to atoms of a Dirichlet process $G_0 \sim DP(\gamma_0, H)$ 205. At the document level, word topics and entity mixture components are atoms of independent DPs 210 and 215, with shared base measure $G_0$. Mathematically, for document d, we have $$G_d^{(w)} \sim DP(\alpha_0, G_0),\ G_d^{(e)} \sim DP(\alpha_0, G_0),$$

where $G_d^{(w)}$ and $G_d^{(e)}$ are word-related DP 210 and entity-related DP 215. Sethuraman's construction in (1) yields:

$$G_d^{(w)} = \sum_{t=1}^{\infty} \pi_{dt}^{(w)} \delta_{\psi_{dt}^{(w)}}, \tag{2}$$

-continued $$G_d^{(e)} = \sum_{t=1}^{\infty} \pi_{dt}^{(e)} \delta_{\psi_{dt}^{(e)}}$$

In one or more embodiments, these DPs are then used to assign words and entities to topics and mixture components, respectively. In document d, let $z_{dn}^{(w)}$ denote the topic assigned to the n-th word, and $z_{dm}^{(e)}$ denote the mixture component assigned to the m-th entity. Using the mixing proportions of DPs in (2), one obtains:

$$p(z_{dn}^{(w)}=t)=\pi_{dt}^{(w)},\ p(z_{dm}^{(e)}=t)=\pi_{dt}^{(e)}.$$

For simplicity, index t is used to denote both word and entity related atoms, although they can correspond to different atoms of the global DPs.

In one or more embodiments, the mixing proportions of corpus-level DP are used to map the document atoms to the shared global atoms. More precisely, in one or more embodiments, the word and entity atoms mapping auxiliary variables $c_d^{(w)}=\{c_{dt}^{(w)}\}_{t=1}^{\infty}$ and $c_d^{(e)}=\{c_{dt}^{(e)}\}_{t=1}^{\infty}$. The mapping probabilities may then be expressed as:

$$p(c_{d(}^{w)}=k)=\beta_k,\ p(c_d^{(e)}=k)=\beta_k.$$

In one or more embodiments, the mapping probabilities may be updated by $\beta_k$.

TMKGE embodiments allow flexible sharing of information between knowledge graphs and documents. This sharing provides an important advantage, as in practice only partial relational information are available, and thus strictly forcing the topics and entity mixtures to share components may lead to reducing the power of model to correctly recover the latent structure of the data. Furthermore, the nonparametric nature of the model embodiments enables the automatic discovery of number of atoms for both words and entities, at document and corpus levels.

In one or more embodiments, each atom of corpus DP ($G_0$) corresponds to a set of parameters for both words and entities. Atom k contains topic-word Dirichlet distribution $\phi_k=(\phi_{k1}, \ldots, \phi_{kV})^T$ 220, and entity Gaussian mixture parameters $\{\mu_k, \Lambda_k\}$ 225. Given $\phi_k$ and topic assignment variables, the generative process 230 for n-th word of document d is:

$$z_{dn}^{(w)} \sim \mathrm{Mult}(\pi_d^{(w)}),$$

$$(w_{dn}|z_{dn}^{(w)}=t, c_{dt}^{(w)}=k,\ \phi_k) \sim \mathrm{Mult}(\phi_k).$$

In similar fashion, the generative process 235 of the m-th entity of document d is:

$$z_{dm}^{(e)} \sim \mathrm{Mult}(\ _d^{(e)}),$$

$$(e_{dm}|z_{dm}^{(}e)=t, c_{dt}^{(e)}=k,\ \mu_k,\ \Lambda_k) \sim N(\mu_k, \Lambda_k^{-1}),$$

where $\mu_k$ and $\Lambda_k$ are the mean and precision matrix of multivariate Gaussian distribution.

In one or more embodiments, conjugate priors are imposed on both word and entity components parameters as:

$$\phi_k \sim \mathrm{Dir}(\eta, \ldots, \eta), \mu_k \sim \mathrm{N}(m_0, (\rho_0\Lambda_k)^{-1}),$$

$$\Lambda_k \sim \mathrm{Wishart}(v_0, W_0).$$

FIG. 3 depicts a method for determining latent topics for a corpus of documents, according to embodiments of the present disclosure. In one or more embodiments, given a corpus of documents in which each document comprises words and entities: (1) entity embeddings obtained from a knowledge graph are used to represent entities in the corpus of documents; and (2) for each document in the corpus of documents, a word frequency representation for words from the document is generated (305). Then, in one or more embodiments, the entity embeddings and the word frequency representations are used (310) as inputs to a topic model to generate latent topics for the corpus of documents. In one or more embodiments, the topic model comprises: a corpus-level Dirichlet process that uses the word frequency representations and the entity embeddings to obtain a shared base measure that is used as a prior for two document-level Dirichlet processes; a first document-level Dirichlet process that uses the shared base measure as a prior to generate a latent topic distribution for words; a second document-level Dirichlet process that uses the shared base measure as a prior to generate a latent topic distribution for entity embeddings; a word generative process that use the latent topic distribution for words and a word-level Dirichlet process to assign latent topics to words; and using the topic distribution for entity mixtures and a distribution to assign latent topics to entity embeddings.

It should be noted that TMKGE embodiments may be used as a generative model. For example, in one or more embodiments, given a set of topic model parameters (i.e., a trained topic model), the topic model may be used to generate words for a document or documents.

3. Online Variational Inference Embodiments

In this section, embodiments of an online variational inference methodology for efficient learning of TMKGE model parameters are disclosed. In one or more embodiments, a fully factorized variational distribution based on stick-breaking construction is used, and online mean-field variational inference is performed. In addition to topic parameters $\phi_k$ and entity mixture parameters $\{\mu_k, \Lambda_k\}$, other parameters of interest are corpus-level stick proportions $\beta'=\{B'_k\}_{t=1}^{\infty}$, document-level stick proportions for words $\pi'^{(w)}_d=\{\pi'^{(w)}_{dt}\}_{t=1}^{\infty}$ and entities $\pi'^{(e)}_d=\{\pi'^{(e)}_{dt}\}_{t=1}^{\infty}$, topic assignments for words $z_d^{(w)}=\{z_{dn}^{(w)}\}_{n=1}^{N_d^{(w)}}$, mixture assignments for entities $z_d^{(e)}=\{z_{dm}^{(e)}\}_{m=1}^{D_d^{(e)}}$, and mapping variables $c_d^{(w)}$ and $c_d^{(e)}$. The word-related and entity-related parameters may be denoted as $\Theta^{(w)}$ and $\Theta^{(e)}$, respectively. Then, the variational distribution factorizes as:

$$q(\beta', \Theta^{(w)}, \Theta^{(e)})=q(\beta')q(\Theta^{(w)})q(\Theta^{(e)}).$$

For corpus-level stick proportions, in one or more embodiments, a Beta distribution may be assumed:

$$q(\beta') = \prod_{k=1}^{K-1} \mathrm{Beta}(\beta'_k \mid u_k, v_k),$$

where the number of global atoms is truncated at K, thereby $q(\beta'_k=1)=1$. For the word-related parameters $\Theta^{(w)}$, we have $$q(\Theta^{(w)}) = q(c^{(w)})q(z^{(w)})q(\pi'^{(w)})q(\phi),$$

$$q(c^{(w)}) = \prod_{d=1}^{D} \prod_{t=1}^{T-1} \mathrm{Mult}(\varphi_{dt}^{(w)}),$$

$$q(z^{(w)}) = \prod_{d=1}^{D} \prod_{n=1}^{N_d^{(w)}} \mathrm{Mult}(\varsigma_{dt}^{(w)}),$$

-continued $$q\left(\pi'^{(w)}\right)=\prod_{d=1}^{D}\prod_{t=1}^{T-1}\mathrm{Beta}\left(\pi'_{dt}\mid a_{dt}^{(w)},b_{dt}^{(w)}\right),$$

$$q(\phi)=\prod_{k=1}^{K}Dir(\lambda_k).$$

The variational distributions for entity-related parameters have a similar form to the above distributions, except the Gaussian mixture parameters, which may be expressed as follows:

$$q(\mu_k)=N(m_k,\rho_k\Lambda_k)^{-1}),\ q(\Lambda_k)=\mathrm{Wishart}(v_k,W_k).$$

In standard variational inference theory, the evidence lower bound (ELBO), which is the lower bound to the marginal log likelihood of the observed data, is maximized to find the best variational approximation to the true intractable posterior. Given the modeling framework of TMKGE, the ELBO may be written as:

$$\begin{aligned}\mathcal{L}(q)=&\\ &\sum_{d}\Big\{\mathbb{E}\Big[\log\Big(p\big(w_d\mid c_d^{(w)},z_d^{(w)},\phi\big)p\big(c_d^{(w)}\mid\beta'\big)\times p\big(z_d^{(w)}\mid\pi_d'^{(w)}\big)p\big(e_d\mid c_d^{(e)},z_d^{(e)},\mu,\\ &\Lambda\big)\times p\big(c_d^{(e)}\mid\beta'\big)p\big(z_d^{(e)}\mid\pi_d'^{(e)}\big)p\big(\pi_d'^{(w)}\mid\alpha_0\big)p\big(\pi_d'^{(e)}\mid\alpha_0\big)\Big)\Big]+H\big(q\big(c_d^{(w)}\big)\big)+\\ &H\big(q\big(z_d^{(w)}\big)\big)+H\big(q\big(\pi_d'^{(w)}\big)\big)+H\big(q\big(c_d^{(e)}\big)\big)+H\big(q\big(z_d^{(e)}\big)\big)+H\big(q\big(\pi'^{(e)}_d\big)\big)\Big\}+\\ &\mathbb{E}[\log(p(\beta')p(\phi)p(\mu,\Lambda))]+H(q(\beta'))+H(q(\phi))+H(q(\mu,\Lambda)),\end{aligned}$$

where H(·) is the entropy term for variational distribution. By taking derivatives of this lower bound with respect to each variational parameter, the coordinate ascent update steps may be derived.

In one or more embodiments, an online variational inference for TMKGE, to process large datasets was developed. Given the existing corpus-level parameters, first a document d may be sampled and then its optimal document-level variational parameters may be computed. For word-related variational parameters, these updates include:

$$\alpha_{dt}^{(w)}=1+\Sigma_n\zeta_{dnt}^{(w)},\ b_{dt}^{(w)}=\propto_0+\Sigma_n\Sigma_{s=t+1}^{T}\zeta_{dns}^{(w)},$$

$$\varphi_{dtk}^{(w)}\propto\exp(\Sigma_n\zeta_{dns}^{(w)}\,\mathbb{E}_q[\log p(w_{dn}|\phi_k)]\,\mathbb{E}_q[\log\beta_k]),$$

$$\zeta_{dnt}^{(w)}\propto\exp(\Sigma_k\varphi_{dtk}^{(w)}\,\mathbb{E}_q[\log p(w_{dn}|\phi_k)]\,\mathbb{E}_q[\log\pi_{dt}^{(w)}])\tag{3}$$

where expectations are with respect to variational distributions and have closed forms. For entity-related variational parameters, similar updates may be derived, with the term $\mathbb{E}_q$ [log p $(e_{dm}|\mu_k,\phi_k)$] replacing $\mathbb{E}_q$[log p$(w_{dn}|\phi_k)$]. For the corpus-level variational parameters, the natural gradients are used:

$$\partial\lambda_{kv}=-\lambda_{kv}+\eta+D\sum_t\varphi_{dtk}^{(w)}\left(\sum_n\varsigma_{dnt}^{(w)}I[w_{dn}=v]\right),\tag{4}$$

$$\partial m_k=-m_k+\frac{D\sum_{m,t}\varphi_{dtk}^{(e)}\varsigma_{dnt}^{(e)}e_{dm}+\rho_0m_0}{Dr_k+\rho_0},$$

$$\partial\rho_k=-\rho_k+\rho_0+Dr_k,$$

$$\partial v_k=-v_k+v_0+Dr_k,$$

-continued $$\partial W_k=-W_k+\left(W_0^{-1}+D\sum_{m,t}\varphi_{dtk}^{(e)}\varsigma_{dnt}^{(e)}e_{dm}e_{dm}^{T}\right)^{-1},$$

$$\partial u_k=-u_k+1+D\sum_t\left(\varphi_{dtk}^{(w)}+\varphi_{dtk}^{(e)}\right),$$

$$\partial v_k=-v_k+\gamma_0+D\sum_t\sum_{\ell=k+1}^{K}\left(\varphi_{dt\ell}^{(w)}+\varphi_{dt\ell}^{(e)}\right).$$

In one or more embodiments, the corpus-level parameters are then updated using these natural gradients and a learning rate parameter $E_t$. For instance, for topic-words distribution parameters, we have $$\lambda\leftarrow\lambda+\epsilon_{t_0}\partial\lambda\tag{5}$$

The rest of corpus-level variational parameters in (4), above, may be similarly updated. To ensure that the parameters converge to a stationary point, in one or more embodiments, the learning rate satisfies $\Sigma_{t_0=1}^{\infty}\in_{t_0=1}^{\infty}\in_{t_0}^{2}<\infty$.

In one or more embodiments, $\in_{t_c}=(\tau_0+t_0)^{-k}$ is used, where $\kappa\in(0.5,1]$ and $\tau_0>0$. In one or more embodiments, to improve the stability of online variational inference, a mini-batch of documents are used to compute the natural gradients. That is, the contribution of the single document d in (4), above, may be replaced by sum of contributions of documents in the minibatch S, and the factor D is replaced by D/|S|. An example of the overall scheme of online variational inference for TMKGE is shown in Methodology 1, below.

| Methodology 1: Online variational inference embodiment for TMKGE framework embodiments: |
|---|
| Initialize corpus-level variational parameters. |
| while Stopping criterion or criteria is not met do |
| Sample a random document d from the corpus. |
| Update $a_d^{(w)}$, $b_d^{(w)}$, $\varphi_d^{(w)}$, and $\zeta_d^{(w)}$ using (3). |
| Update $a_d^{(e)}$, $b_d^{(e)}$, $\varphi_d^{(e)}$, and $\zeta_d^{(e)}$ using (3). |
| Compute the nature gradients using (4). |
| Set $\epsilon_{t0}=(\tau_0+t_0)^{-k}$ and $t_0\leftarrow t_0+1$. |
| Update all corpus-level parameters as (5) |
| end |

Figure 4:
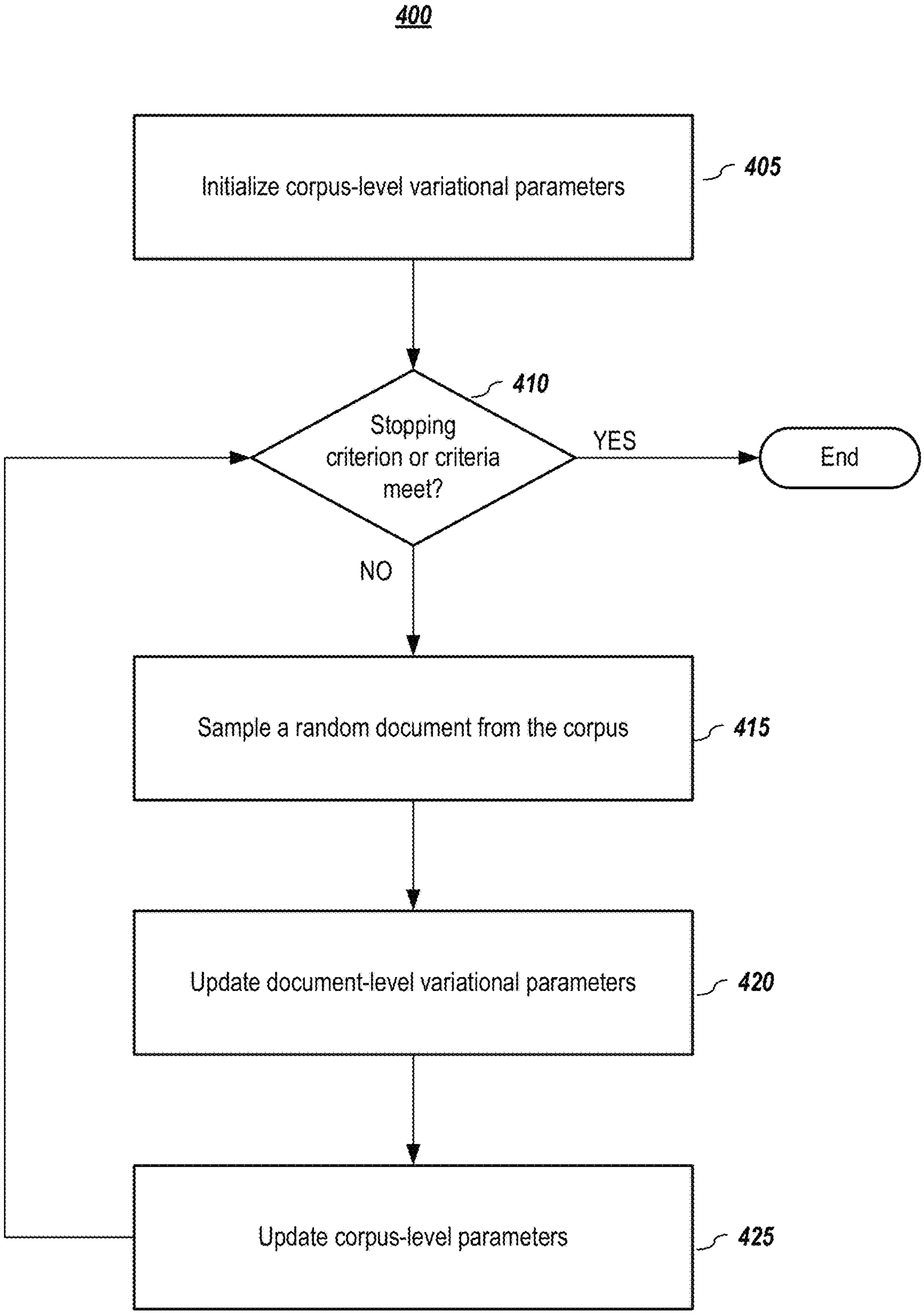
FIG. 4 depicts a variational inference for a TMKGE framework, according to embodiments of the present disclosure.

Related to Methodology 1, FIG. 4 depicts a variational inference for a TMKGE framework, according to embodiments of the present disclosure. In one or more embodiments, an online stochastic optimization with natural gradients for variational inferences methodology commences (405) by initializing corpus-level variational parameters of the topic model. Then, a set update steps are iteratively performed until a stop condition (e.g., a stopping criterion or criteria) has been met (410). As illustrated in FIG. 4, the iterative steps include: sampling (415) a document at random from the corpus of documents; updating (420) document-level variational parameters of the topic model; and updating (425) corpus-level parameters.

In one or more embodiments, a stopping criterion or criteria may include one or more of the following: a number of iterations has been performed, a set amount of time has elapsed, a difference in one or more parameters between successive iterations is less than an update threshold, a probability of achieving significant changes in a next iteration is below a change threshold; divergence of one or more parameters; and a limit has been met.

Figure 5:
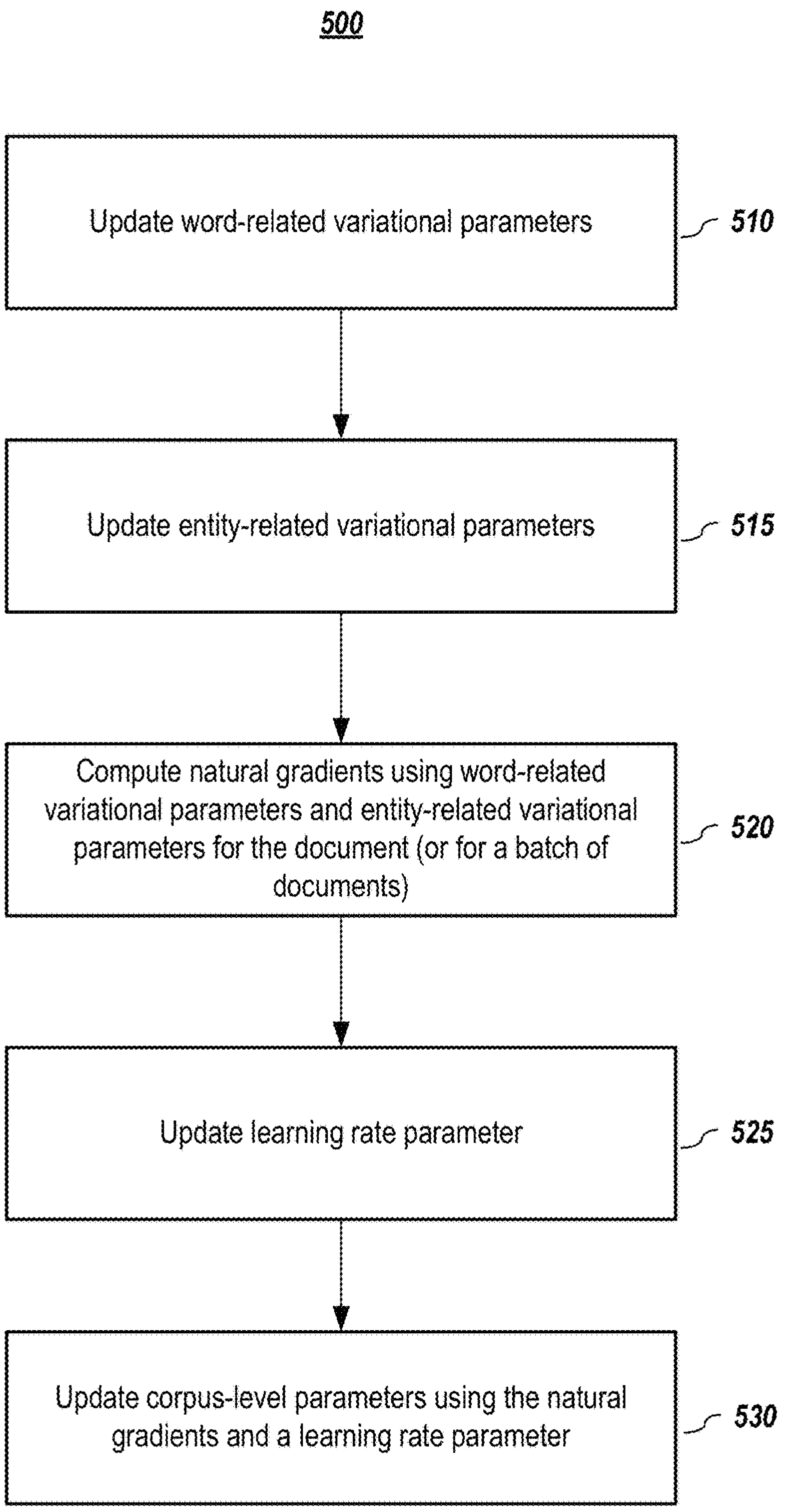
FIG. 5 depicts a method for updating document-level variational parameters and updating corpus-level parameters, according to embodiments of the present disclosure.

FIG. 5 depicts a method for updating document-level variational parameters and updating corpus-level parameters as discussed in FIG. 4, according to embodiments of the present disclosure. In one or more embodiments, the step of updating document-level variational parameters may comprise updating (510) word-related variational parameters of the topic model, and updating (515) entity-related variational parameters of the topic model. In one or more embodiments, natural gradients are computed (520) using the word-related variational parameters and the entity-related variational parameters, and a learning rate parameter may also be determined (525). Finally, in one or more embodiments, the step of updating corpus-level parameters comprises updating (530) corpus-level parameters of the topic model using the natural gradients and the learning rate parameter. In one or more embodiments, the step of updating corpus-level parameters including updating the corpus-level variational parameters.

D. EXPERIMENTAL RESULTS

It shall be noted that these experiments and results are provided by way of illustration and were performed under specific conditions using a specific embodiment or embodiments; accordingly, neither these experiments nor their results shall be used to limit the scope of the disclosure of the current patent document.

TMKGE embodiments were evaluated on two experimental tasks and their performance was compared to those of LDA, HDP and KGE-LDA. For LDA and HDP, the online variational inference implementations were used. More precisely, the framework embodiments were evaluated by testing whether they found coherent and meaningful topics and by testing whether they achieved good performance in document classification.

Experiments on three popular datasets; 20-Newsgroups (20NG), NIPS, and the Ohsumed corpus. The 2ONG dataset contains 18,846 documents evenly categorized into 20 different categories.

The NIPS dataset contains 1,740 papers from the NIPS conference. The Ohsumed corpus is from the MEDLINE database. The 13,929 unique Cardiovascular diseases abstracts in the first 20,000 abstracts of the years 1991-1996 were used. Each document in the set has one or more associated categories from the 23 disease categories. The documents belonging to multiple categories are eliminated so that 7,400 documents belonging to only one category remain. The datasets are tokenized with Stanford CoreNLP, which is Java toolkit that provides various natural language processing (NPL) tools. After standard pre-processing (such as removing stop words), there were 20,881 distinct words in the 20NG dataset, 14,482 distinct words in the NIPS dataset, and 8,446 distinct words in the Ohsumed dataset.

1. External Knowledge Source

The knowledge graph employed for the experimental testing was Word-Net (George A. Miller (1995). WordNet: A Lexical Database for English. *Communications of the ACM, Vol.* 38, No. 11: 39-41). WordNet is a large lexical knowledge graph. Entities in WordNet are synonyms which express distinct concepts. Relations in WordNet mainly involve conceptual-semantic and lexical relations. A subset of Word-Net (WN18), which was introduced in Bordes et al., "Learning Structured Embeddings of Knowledge Bases," In Proceedings of the Twenty-Fifth AAAI Conference on Artificial Intelligence (AAAI), 2011, San Francisco, Calif., was used. WN18 contains 151,442 triplets with 40,943 entities and 18 relations. In the experiments, tokenized words were linked to entities in WN18 using Natural Language Toolkit (NLTK) (Steven Bird and Edward Loper, NLTK: The Natural Language Toolkit, In Proceedings of the ACL 2004 on Interactive poster and demonstration sessions, page 31. Association for Computational Linguistics).

2. Model Parameters

In the experiments, for each method, the results based on the hyperparameter settings that obtain the best performances are reported. For TMKGE and HDP, the results for K=300, T=20 and K=100, T=10 cases are reported. For LDA and KGE-LDA, respectively, the results for K=100 and K=30 are reported. Throughout this work, the dimension of entity embedding is fixed as P=5. For online variational inference, the algorithms were run for 1000 iterations, with mini-batch size of 100.

3. Topic Coherence

The performance of the tested TMKGE embodiments were assessed based on topic coherence. Topic coherence has been shown to be more consistent with human judgment than other typical topic model metrics such as perplexity. Both quantitative and qualitative analysis of the topics discovered by the TMKGE embodiments were performed, and their performance was compared to those of LDA, HDP and KGE-LDA.

a) Quantitative Analysis

The coherence of discovered topics was evaluated by the point-wise mutual information (PMI) Topic Coherence metric. The PMI Topic Coherence was implemented as follows:

$$PMI(k)=\sum_{j=2}^{N}\sum_{i=1}^{j-1}\log\frac{p(w_i,w_j)}{p(w_i)p(w_j)}$$

where k refers to a topic, N refers to the number of top words of k, $p(w_i)$ is the probability that wi appears in a document, $p(w_i, w_j)$ is the probability that $w_i$ and $w_j$ co-occur in the same document. A higher PMI score implies a more coherent topic. Following KGE-LDA, 4,776,093 Wikipedia articles were employed for obtaining topic coherence scores. Instead of using a fixed value of N (the number of top words, e.g., N=5 or N=10), N was varied in a range from 5 to 30. It has been suggested that calculating topic coherence over several different cardinalities and averaging results in a substantially more stable evaluation.

TABLE 1 shows the average topic coherence for different methods and datasets. It can be observed that for the three datasets, the tested TMKGE embodiment achieves highest topic coherence in almost all top word sizes. In the few cases which the tested TMKGE embodiment did not rank highest, there only exist subtle differences with the top performing result. This shows that knowledge graph embedding improves the coherence of discovered topics. Further, for top 10 words, the topic coherence of all three datasets are higher than those obtained by KGE-LDA. This shows that topic modeling based on HDP for both entity embedding and words enjoys incomparable advantages over LDA-based modeling.

TABLE 1

Topic Coherence of all models on three datasets with different number of top words. A higher PMI score implies a more coherent topic. Improvements of the tested TMKGE embodiment over other methods are significant.

| | | | number of top words and PMI scores | | | | | |
|---|---|---|---|---|---|---|---|---|
| model | parameters | data source | 5 | 10 | 15 | 20 | 25 | 30 |
| TMKGE | K = 300, T = 20 | 20 | 20.81 | 91.1 | 210 | 380 | 602 | 876 |
| HDP | K = 300, T = 20 | Newsgroup | 20.02 | 91.59 | 212.64 | 384.08 | 598.39 | 868.715 |
| LDA | K = 100 | | 13.5 | 64.6 | 163.4 | 285 | 455.2 | 671.13 |
| KGE-LDA | K = 30 | | 18.9 | 69.8 | 187.5 | 320.6 | 482.7 | 616.5 |
| TMKGE | K = 300, T = 20 | NIPS | 16.63 | 97.14 | 160.31 | 299.56 | 474.53 | 685.47 |
| HDP | K = 300, T = 20 | | 16.71 | 66.76 | 157.22 | 280.15 | 444.03 | 643.11 |
| LDA | K = 100 | | 13.9 | 67.6 | 161.9 | 297 | 471.2 | 681.13 |
| KGE-LDA | K = 30 | | 14.3 | 97.2 | 163.4 | 285.3 | 453.3 | 645.4 |
| TMKGE | K = 300, T = 20 | Ohsumed | 21.58 | 123.3 | 237.29 | 407.74 | 624.21 | 895.47 |
| HDP | K = 300, T = 20 | | 15.64 | 70.66 | 168.2 | 338.97 | 582.97 | 864.98 |
| LDA | K = 100 | | 11.9 | 65.6 | 131.9 | 257 | 481.2 | 691.13 |
| KGE-LDA | K = 30 | | 15.6 | 116.5 | 185.4 | 354.2 | 585.4 | 795.6 |

b) Qualitative Analysis

TABLE 2, which is provided in FIG. 6, shows example topics with their PMI scores learned from the three corpora by KGE-LDA and the tested TMKGE model embodiment. The last row for each model is the topic coherence computed using the 4,776,093 Wikipedia documents as reference. Some medical short words: pbl=Peripheral blood leucocyte, meh =Mean erythrocyte hemoglobin. For comparison, similar topics to those listed in the KGE-LDA paper (Liang Yao, Yin Zhang, Baogang Wei, Zhe Jin, Rui Zhang, Yangyang Zhang, and Qinfei Chen, "Incorporating knowledge graph embeddings into topic modeling," In Proceedings of the Thirty-First AAAI Conference on Artificial Intelligence (AAAI), pages 3119-3126, San Francisco, Calif. (2017)) are reported.

It can be seen that the TMKGE embodiment found quite closely related words in a topic. For example, for the second column of 2ONG, topic words from both the TMKGE embodiment and KGE-LDA are related to computers. However, it can be noted that words from the TMKGE embodiment focus more on the core words of computer science. In contrast, words from the same topic in KGE-LDA seems to be closer to the brand, such as Windows, Mac, or Apple. In addition, topics found from the TMKGE embodiment are more diverse than those found in KGE-LDA. For 20NG, the three topics that are listed here refer to theology, computer science, and middle east (respectively), while the three topics from KGE-LDA refer to internet, computer, and car (respectively). Both the TMKGE embodiment and KGE-LDA discover probability-related and machine learning topics with different top words from NIPS dataset. Roughly speaking, KGE-LDA discovers gene-related, cancer-related, and treatment-related topics from Ohsumed corpus. The TMKGE embodiment discovered more diverse and more specific topics. For example, one topic TMKGE discovered is about Vietnamese veterans, cancer-related, and sexual-disease topics. From the perspective of topic coherence, it can also be seen that the TMKGE embodiment obtains higher PMI score in most of those topics. The whole trend is consistent with the average PMI score reported in the last section. Overall, the TMKGE embodiment performed better than other topic models, including LDA, HDP, and KGE-LDA in terms of average PMI and also in qualitative case studies.

4. Document Classification

An embodiment of the proposed methodology was evaluated through document classification following the approach in Wei Li and Andrew McCallum, "Pachinko Allocation: DAG-Structured Mixture Models of Topic Correlations," In Proceedings of the 23rd International Conference on Machine learning (ICML) 2006, pages 577-584, Pittsburgh, Pa., for document classification.

A five-way classification was conducted on the comp subject of 20 newsgroup dataset and on the top five most frequent labels of Ohsumed dataset (no labels for NIPS dataset), where each class of documents is divided into 75% training and 25% testing. For each class, the LDA, HDP, and TMKGE models were trained on the training documents, and then the predictive likelihood for the test documents was calculated using the E-step in the variational inference procedure of LDA. A document was classified correctly if its corresponding model produced the highest likelihood.

The average classification accuracy for TMKGE, HDP, and LDA over five repeated simulations are presented in TABLE 3. This table includes the classification accuracy for KGE-LDA, where the learned topic proportions were used as features for a support vector machine (SVM) classifier. For the majority of document classes, the TMKGE embodiment had the best classification accuracy, except for the class mac. As shown, the SVM classifier based on KGE-LDA had significantly worst performance. For more complete comparisons experiments were run on all subjects of 20 newsgroup dataset, and the experimental results are provided in TABLE 4. The TMKGE embodiment achieved the best performance over all models. A few points can be observed from the superior performance of the tested TMKGE embodiment. Firstly, it appears that the addition of unnormalized knowledge graph embedding into the TMKGE embodiment as a proportional vector to the word vector boosts the performance. Secondly, the selection of HDP over LDA plays an important role. This can be indicated from the poor performance of KGE-LDA (which is even worse than BOW (Bag of Words)). More impressively, the TMKGE embodiment achieved even much better performances than STE-Diff, TWE (Topic Word Embedding), and TMSA (Topic Modeling and Sparse Autoencoder), all of which involve the integration of word embedding and topic modeling. Impressively, the TMKGE embodiment shows its supremacy over the state-of-the-art model, TMSA with high margins. This shows that the knowledge graph structure included into the entity embedding conveys more information than pure word embedding. Meanwhile, this also shows that the two proportional vectors generated with online HDP enables the flexible sharing of information between words and entities. Accordingly, more coherent topics are extracted, and the classification result are boosted as well.

TABLE 3

Document Classification Accuracy

| class | LDA | HDP | KGE-LDA | TMKGE |
|---|---|---|---|---|
| 20 Newsgroup | | | | |
| pc | 68.58 | 78.90 | 67.2 | 78.96 |
| os | 71.67 | 80.69 | 70.7 | 82.31 |
| mac | 82.04 | 87.13 | 68.1 | 86.48 |
| windows.x | 84.00 | 83.47 | 64.4 | 84.98 |
| graphics | 81.20 | 81.95 | 65.4 | 83.01 |
| Ohsumed | | | | |
| C04 | 50.56 | 73.03 | 59.10 | 73.8 |
| C10 | 46.18 | 63.00 | 54.40 | 64.97 |
| C14 | 51.49 | 44.62 | 33.20 | 52.34 |
| C21 | 86.52 | 89.5 | 83.70 | 89.71 |
| C23 | 68.20 | 81.95 | 75.30 | 86.1 |

TABLE 4

Document classification: all 20 newsgroup

| Model | Acc (%) | Model | Acc (%) |
|---|---|---|---|
| BOW | 79.7 | STE-Diff | 82.9 |
| Skip-Gram | 75.4 | LDA | 77.5 |
| TWE | 81.5 | TMSA | 83.5 |
| PV | 75.4 | HDP | 82.4 |
| GPU-DMM | 48.0 | KGE-LDA | 70.5 |
| STE-Same | 80.4 | TMKGE | 88.79 |

E. COMPUTING SYSTEM EMBODIMENTS

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 7:
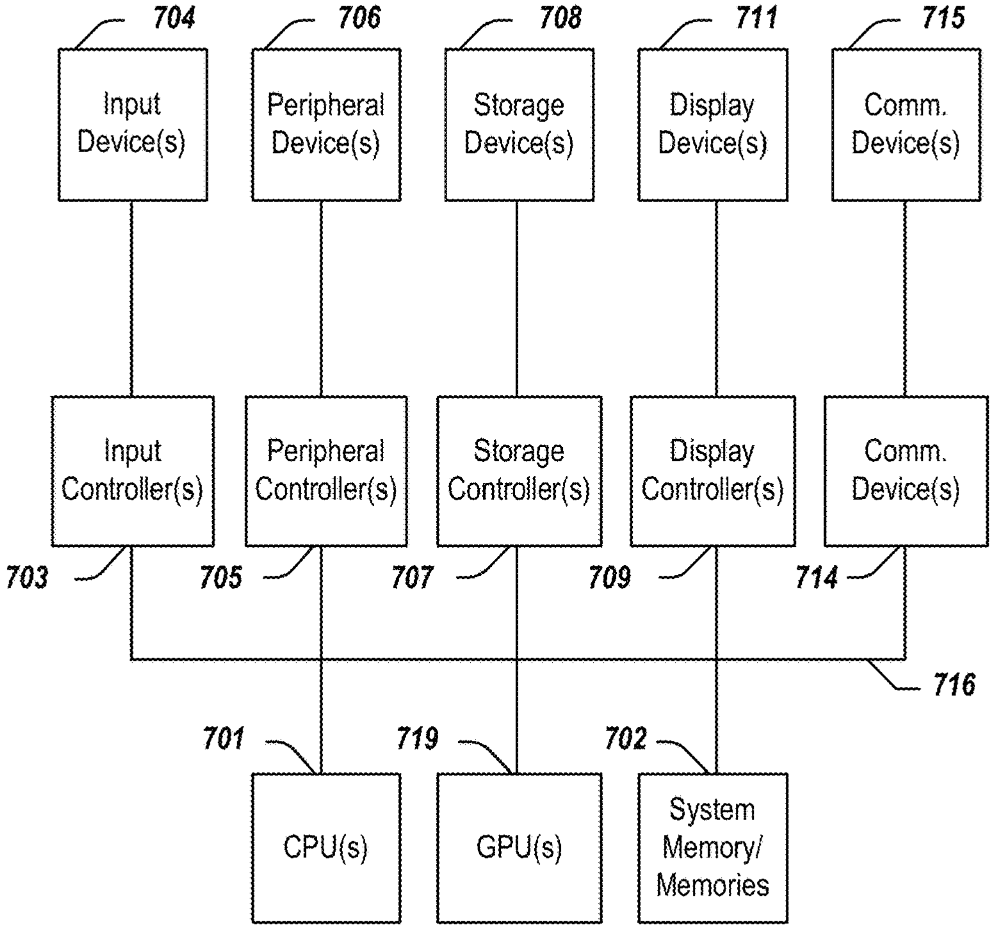
FIG. 7 depicts a simplified block diagram of a computing device/information handling system, in accordance with embodiments of the present document.

FIG. 7 depicts a simplified block diagram of a computing device/information handling system (or computing system) according to embodiments of the present disclosure. It will be understood that the functionalities shown for system 700 may operate to support various embodiments of a computing system—although it shall be understood that a computing system may be differently configured and include different components, including having fewer or more components as depicted in FIG. 7.

As illustrated in FIG. 7, the computing system 700 includes one or more central processing units (CPU) 701 that provides computing resources and controls the computer. CPU 701 may be implemented with a microprocessor or the like, and may also include one or more graphics processing units (GPU) 719 and/or a floating-point coprocessor for mathematical computations. System 700 may also include a system memory 702, which may be in the form of random-access memory (RAM), read-only memory (ROM), or both.

A number of controllers and peripheral devices may also be provided, as shown in FIG. 7. An input controller 703 represents an interface to various input device(s) 704, such as a keyboard, mouse, touchscreen, and/or stylus. The computing system 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present disclosure. Storage device(s) 708 may also be used to store processed data or data to be processed in accordance with the disclosure. The system 700 may also include a display controller 709 for providing an interface to a display device 711, which may be a cathode ray tube (CRT), a thin film transistor (TFT) display, organic light-emitting diode, electroluminescent panel, plasma panel, or other type of display. The computing system 700 may also include one or more peripheral controllers or interfaces 705 for one or more peripherals 706. Examples of peripherals may include one or more printers, scanners, input devices, output devices, sensors, and the like. A communications controller 714 may interface with one or more communication devices 715, which enables the system 700 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

F. SOME CONCLUSIONS

Presented herein are embodiments of a topic modeling with knowledge graph embedding (TMKGE) model. TMKGE model are Bayesian nonparametric models based on hierarchical Dirichlet process for incorporation of entity embeddings from external knowledge graphs into topic modeling. Embodiments allows for flexible sharing of information between documents and knowledge graph. Specifically, TMKGE embodiments avoid forcing the words and entities to identical latent factors, thus making it a suitable framework for scenarios where only partial relational information are available.

Furthermore, as a Bayesian nonparametric model, TMKGE embodiments learn the number of word topics and entity mixture components automatically from the data.

Also, embodiments of a new, efficient and scalable online variational inference method based on a stick-breaking construction of HDP were developed for TMKGE models, making TMKGE suitable for large document corpora and KGs.

Comprehensive experiments on different datasets indicate that TMKGE models significantly outperforms state-of-the-art topic modeling methods in terms of both topic coherence and document classification accuracy.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implement method for determining latent topics for a corpus of documents, the method comprising:

given a corpus of documents in which each document comprises words and entities:

using entity embeddings obtained from a knowledge graph to represent entities in the corpus of documents; and for each document in the corpus of documents, generating a word frequency representation for words from the document;

using the entity embeddings and the word frequency representations as an input to a topic model to generate latent topics for the corpus of documents, the topic model comprising:

a corpus-level Dirichlet process that uses the word frequency representations and the entity embeddings to obtain a shared base measure that is used as a prior for two document-level Dirichlet processes;

a first document-level Dirichlet process that uses the shared base measure as a prior to generate a latent topic distribution for words;

a second document-level Dirichlet process that uses the shared base measure as a prior to generate a latent topic distribution for entity embeddings;

a word generative process that uses the latent topic distribution for words and a word-level Dirichlet process to assign latent topics to words; and using the latent topic distribution for entity embeddings and a distribution to assign latent topics to entity embeddings; and assigning one or more topics to one or more documents from the corpus of documents using at least one or more of the latent topics generated by the topic model.

2. The computer-implement method of claim 1 wherein each atom of the corpus-level Dirichlet process corresponds to a set of parameters for both words and entities.

3. The computer-implement method of claim 1 wherein model parameters for the topic model are learned using an online variational inference methodology.

4. The computer-implement method of claim 3 wherein the step of using an online variational inference methodology to learn the model parameters for the topic model comprises:

initialize corpus-level variational parameters of the topic model; and iteratively performing the following steps until a stop condition has been met:

sampling a document at random from the corpus of documents;

updating document-level variational parameters of the topic model; and updating corpus-level parameters.

5. The computer-implement method of claim 4 wherein the steps of updating document-level variational parameters of the topic model, and updating corpus-level parameters comprise the steps of:

updating word-related variational parameters of the topic model;

updating entity-related variational parameters of the topic model;

computing natural gradients using word-related variational parameters and entity-related variational parameters;

updating a learning rate parameter; and updating corpus-level parameters of the topic model using the natural gradients and the learning rate parameter.

6. The computer-implement method of claim 5 wherein word-related variational parameters and entity-related variational parameters from a batch of documents are used to compute the natural gradients for the topic model to improve stability of the online variational inference methodology.

7. The computer-implement method of claim 1 further comprising the step of:

given a set of topic model parameters, using the topic model to generate words for a document.

8. A non-transitory computer-readable medium or media comprising one or more sequences of instructions which, when executed by at least one processor, causes steps to be performed comprising:

given a corpus of documents in which each document comprises words and entities:

using entity embeddings obtained from a knowledge graph to represent entities in the corpus of documents; and for each document in the corpus of documents, generating a word frequency representation for words from the document;

using the entity embeddings and the word frequency representations as an input to a topic model to generate latent topics for the corpus of documents, the topic model comprising:

a corpus-level Dirichlet process that uses the word frequency representations and the entity embeddings to obtain a shared base measure that is used as a prior for two document-level Dirichlet processes;

a first document-level Dirichlet process that uses the shared base measure as a prior to generate a latent topic distribution for words;

a second document-level Dirichlet process that uses the shared base measure as a prior to generate a latent topic distribution for entity embeddings;

a word generative process that uses the latent topic distribution for words and a word-level Dirichlet process to assign latent topics to words; and using the latent topic distribution for entity embeddings and a distribution to assign latent topics to entity embeddings; and assigning one or more topics to one or more documents from the corpus of documents using at least one or more of the latent topics generated by the topic model.

9. The non-transitory computer-readable medium or media of claim 8 wherein each atom of the corpus-level Dirichlet process corresponds to a set of parameters for both words and entities.

10. The non-transitory computer-readable medium or media of claim 8 wherein model parameters for the topic model are learned using an online variational inference methodology.

11. The non-transitory computer-readable medium or media of claim 10 wherein the step of using an online variational inference methodology to learn the model parameters for the topic model comprises:

initialize corpus-level variational parameters of the topic model; and iteratively performing the following steps until a stop condition has been met:

sampling a document at random from the corpus of documents;

updating document-level variational parameters of the topic model; and updating corpus-level parameters.

12. The non-transitory computer-readable medium or media of claim 11 wherein the steps of updating document-level variational parameters of the topic model, and updating corpus-level parameters comprise the steps of:

updating word-related variational parameters of the topic model;

updating entity-related variational parameters of the topic model;

computing natural gradients using word-related variational parameters and entity-related variational parameters;

updating a learning rate parameter; and updating corpus-level parameters of the topic model using the natural gradients and the learning rate parameter.

13. The non-transitory computer-readable medium or media of claim 12 wherein word-related variational parameters and entity-related variational parameters from a batch of documents are used to compute the natural gradients for the topic model to improve stability of the online variational inference methodology.

14. The non-transitory computer-readable medium or media of claim 8 further comprising one or more sequences of instructions which, when executed by at least one processor, causes steps to be performed comprising:

given a set of topic model parameters, using the topic model to generate words for a document.

15. A computing system comprising:

at least one processor; and a non-transitory computer-readable medium or media comprising one or more sequences of instructions which, when executed by at least one of the one or more processors, causes steps to be performed comprising:

given a corpus of documents in which each document comprises words and entities:

using entity embeddings obtained from a knowledge graph to represent entities in the corpus of documents; and for each document in the corpus of documents, generating a word frequency representation for words from the document; and using the entity embeddings and the word frequency representations as an input to a topic model to generate latent topics for the corpus of documents, the topic model comprising:

a corpus-level Dirichlet process that uses the word frequency representations and the entity embeddings to obtain a shared base measure that is used as a prior for two document-level Dirichlet processes;

a first document-level Dirichlet process that uses the shared base measure as a prior to generate a latent topic distribution for words;

a second document-level Dirichlet process that uses the shared base measure as a prior to generate a latent topic distribution for entity embeddings;

a word generative process that uses the latent topic distribution for words and a word-level Dirichlet process to assign latent topics to words; and using the latent topic distribution for entity embeddings and a distribution to assign latent topics to entity embeddings; and assigning one or more topics to one or more documents from the corpus of documents using at least one or more of the latent topics generated by the topic model.

16. The computing system of claim 15 wherein each atom of the corpus-level Dirichlet process corresponds to a set of parameters for both words and entities.

17. The computing system of claim 15 wherein model parameters for the topic model are learned using an online variational inference methodology.

18. The computing system of claim 17 wherein the step of using an online variational inference methodology to learn the model parameters for the topic model comprises:

initialize corpus-level variational parameters of the topic model; and iteratively performing the following steps until a stop condition has been met:

sampling a document at random from the corpus of documents;

updating document-level variational parameters of the topic model; and updating corpus-level parameters.

19. The computing system of claim 18 wherein the steps of updating document-level variational parameters of the topic model, and updating corpus-level parameters comprise the steps of:

updating word-related variational parameters of the topic model;

updating entity-related variational parameters of the topic model;

computing natural gradients using word-related variational parameters and entity-related variational parameters;

updating a learning rate parameter; and updating corpus-level parameters of the topic model using the natural gradients and the learning rate parameter.

20. The computing system of claim 19 wherein word-related variational parameters and entity-related variational parameters from a batch of documents are used to compute the natural gradients for the topic model to improve stability of the online variational inference methodology.

* * * * *